(12) United States Patent
Koo

(10) Patent No.: US 9,267,707 B2
(45) Date of Patent: Feb. 23, 2016

(54) HEATING POWER ADJUSTING APPARATUS OF HOT BLAST HEATER

(71) Applicant: Paseco Co., Ltd., Gyeonggi-do (KR)

(72) Inventor: Hae Ryung Koo, Inchon-si (KR)

(73) Assignee: PASECO CO., LTD., Gyeonggi-Do (KR)

( * ) Notice: Subject to any disclaimer, the term of this patent is extended or adjusted under 35 U.S.C. 154(b) by 316 days.

(21) Appl. No.: 13/759,244

(22) Filed: Feb. 5, 2013

(65) Prior Publication Data
US 2014/0109888 A1    Apr. 24, 2014

(30) Foreign Application Priority Data

Oct. 19, 2012   (KR) .................. 10-2012-0116482

(51) Int. Cl.
| | |
|---|---|
| *F24H 9/20* | (2006.01) |
| *F24H 3/04* | (2006.01) |
| *F23L 13/02* | (2006.01) |
| *F23N 3/00* | (2006.01) |
| *F23D 14/60* | (2006.01) |

(52) U.S. Cl.
CPC .............. *F24H 9/2085* (2013.01); *F23D 14/60* (2013.01); *F23L 13/02* (2013.01); *F23N 3/007* (2013.01); *F24H 3/0488* (2013.01); *F23D 2900/21003* (2013.01); *F23N 2035/06* (2013.01)

(58) Field of Classification Search
CPC ............ F23L 13/02; F23L 13/00; F23N 3/02; F23N 3/007; F23N 2035/04; F23N 2035/06; F23D 14/60; F23D 2900/21003; F24H 3/0488; F24H 9/2085
See application file for complete search history.

(56) References Cited

U.S. PATENT DOCUMENTS 8,146,583 B1    4/2012 Lee, Jr.
2003/0155017 A1*  8/2003 Rogalski et al. ......... 137/599.16

* cited by examiner

*Primary Examiner* — Alfred Basichas
(74) *Attorney, Agent, or Firm* — McClure, Qualey & Rodack, LLP

(57) ABSTRACT

Disclosed is a heating power adjusting apparatus of a hot blast heater which controls pressure of air supplied to a burner by executing selectively switching between the cross-sectional areas of orifices in a flow space of air located between a pump and a burner head, and thereby variably adjusts heating power generated from the burner. The heating power adjusting apparatus adjusts includes a valve body including an air injection part, an air exhaust part, and an air flow space between the air injection part and the air exhaust part, an orifice body rotatably installed in the air flow space of the valve body and provided with a plurality of orifices having different flow cross-sectional areas to variably adjust the flow rate of air, and a rotary knob to adjust rotation of the orifice body with respect to the valve body.

7 Claims, 5 Drawing Sheets

HEATING POWER ADJUSTING APPARATUS OF HOT BLAST HEATER

BACKGROUND OF THE INVENTION

1. Field of the Invention

The present invention relates to a heating power adjusting apparatus of a hot blast heater, and more particularly to a heating power adjusting apparatus of a hot blast heater which variably adjusts heating power of a burner via pressure fluctuation through selective switching between the cross-sectional areas of orifices in a flow space of air supplied to a burner head.

2. Description of the Related Art

In general, a hot blast heater is developed so as to be used to raise the indoor temperature of an open space, and executes a function of supplying heated air to a specific space to raise the inner temperature of the space.

Such a hot blast heater is used to indirectly raise the inner temperature of a specific space which is one of industrial facilities, such as a factory, or various places, such as a barn and a vinyl house, through heating of air. Conventional hot blast heaters may be divided into an electric heating type and a combustion heating type according to air heating methods.

First, an electric heating type hot blast heater heats sucked air using heat generated from heat wires or a heater according to power supply, and then supplies the heated air to a specific space so as to achieve heating effects. Such an electric heating type hot blast heater is mainly applied if a space desired to be heated is narrow.

Further, a combustion heating type hot blast heater heats sucked air using heat generated by combustion of fuel in a burner, and then supplies the heated air to a specific space so as to achieve heating effects. Such a combustion heating type hot blast heater is actively applied if a space desired to be heated is relatively broad or if power is not effectively supplied.

Particularly, since it is expected that the combustion heating type hot blast heater has relatively high heat efficiency, as compared with the electric heating type hot blast heater, the combustion heating type hot blast heater is widely used now. That is, the combustion heating type hot blast heater is mainly used in a factory, a vinyl house, a barn, etc., having a relatively wide area.

However, the conventional combustion heating type hot blast heater causes air pollution due to exhaust gas generated during combustion, and thus a safe exhaust path must be guaranteed and a purification function must be provided.

Further, such a hot blast heater must have a function of adjusting a temperature to raise an indoor temperature to a desired level. Therefore, temperature adjustment of the conventional combustion heating type hot blast heater is carried out by variably adjusting an amount of fuel supplied to a combustion chamber of the burner according to a pressure level of air generated by operation of a vane pump.

In this case, the pressure of air generated from the vane pump is obtained by controlling a rotating speed, such control of the rotating speed of the vane pump employs an electronic control method in which a waveform of input voltage of a motor is adjusted and thus requires high costs to manufacture the combustion heating type hot blast heater, and employs a complicated electronic speed control method and thus causes a heavy financial burden to normally maintain, repair and manage equipment.

CITED REFERENCE

Patent Document

U.S. Pat. No. 8,146,583 entitled "Low pressure forced air heater"

SUMMARY OF THE INVENTION

Therefore, the present invention has been made in view of the above problems, and it is an object of the present invention to provide a heating power adjusting apparatus of a hot blast heater which controls pressure of air supplied to a burner by executing selectively switching between the cross-sectional areas of orifices in a flow space of air located between a pump and a burner head, and thus variably adjusts heating power generated from the burner.

In accordance with the present invention, the above and other objects can be accomplished by the provision of a heating power adjusting apparatus of a hot blast heater which adjusts the heating power of the hot blast heater by controlling a flow cross-sectional area of air supplied to a burner of the hot blast heater, including a valve body including an air injection part, an air exhaust part, and an air flow space between the air injection part and the air exhaust part, an orifice body rotatably installed in the air flow space of the valve body and provided with a plurality of orifices having different flow cross-sectional areas to variably adjust the flow rate of air, and a rotary knob to adjust rotation of the orifice body with respect to the valve body.

The heating power adjusting apparatus may further include a rotary shaft connecting the orifice body and the rotary knob.

The rotary shaft may be fixed to the orifice body by a fastening pin, the rotary shaft may be provided with a through hole to install the fastening pin, and the orifice body may be provided with assembly holes to install the fastening pin.

A snap ring may be fastened to the outer circumferential surface of the rotary shaft, the snap ring may be supported by a mounting bracket combined with the valve body and restricts separation of the rotary shaft from the orifice body, and a stepped groove to install the snap ring may be formed on the outer circumferential surface of the rotary shaft.

The heating power adjusting apparatus may further include an O-ring installed at an assembly region between the valve body and the orifice body and maintaining airtightness of the air flow space.

The heating power adjusting apparatus may further include a stopper device installed on the valve body and intermitting the rotating state of the orifice body.

The stopper device may include a plug fixed to an installation part of the valve body by screw connection, a return spring installed in a compressed state within the installation part by the plug, and a metal ball elastically supported by the return spring and restricting rotation of the orifice body within an elasticity range of the return spring.

A plurality of bending grooves supporting the metal ball seated thereon may be formed on the outer circumference of the orifice body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the annexed drawings.

Figure 1:
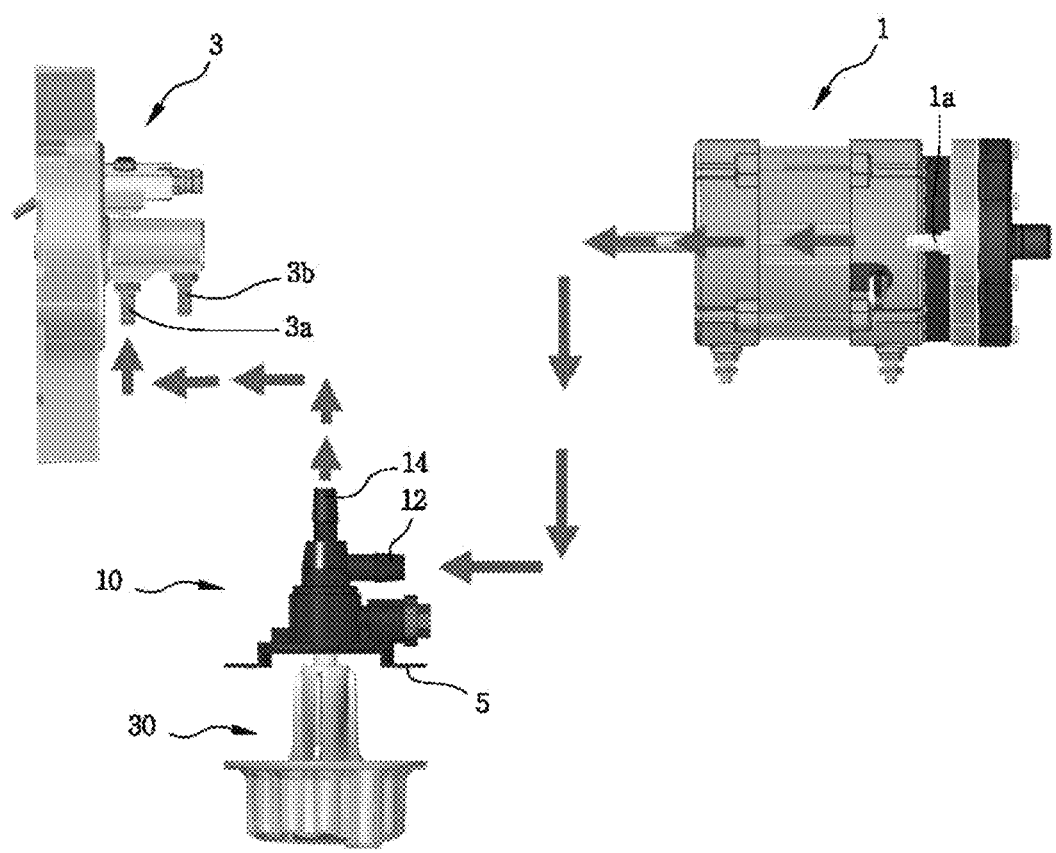
FIG. 1 is a view schematically illustrating the installed state of a heating power adjusting apparatus of a hot blast heater in accordance with one embodiment of the present invention.
Figure 2:
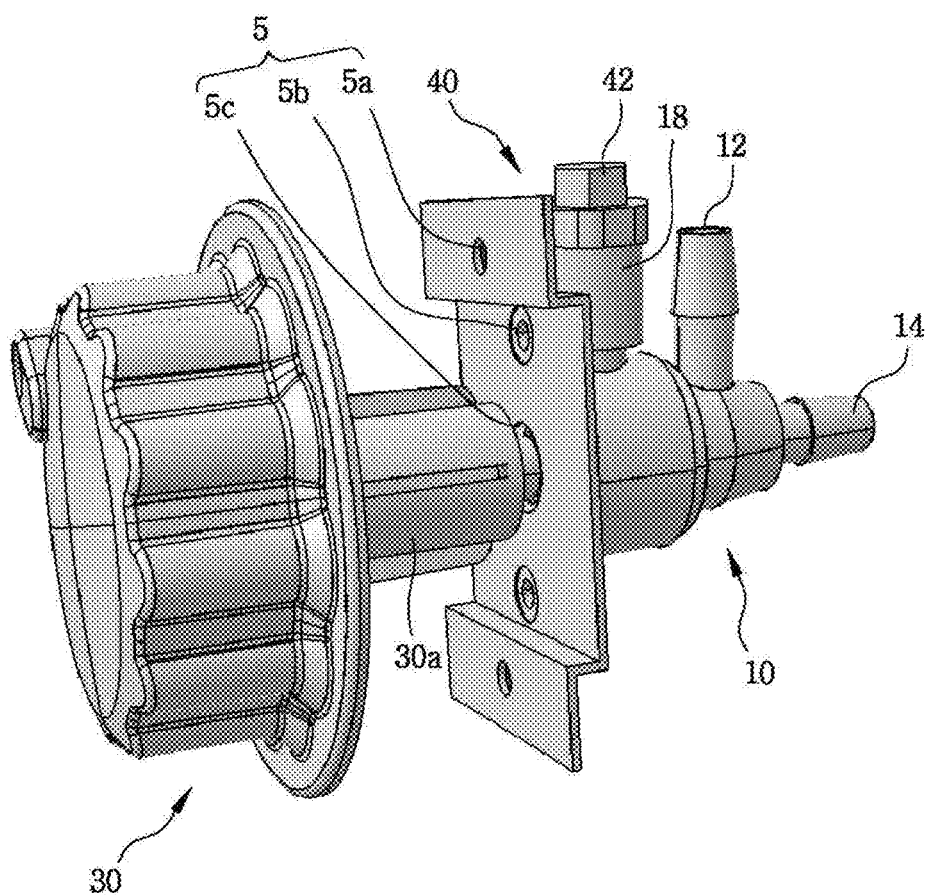
FIG. 2 is a perspective view illustrating the configuration of the heating power adjusting apparatus in accordance with the embodiment of the present invention.
Figure 3:
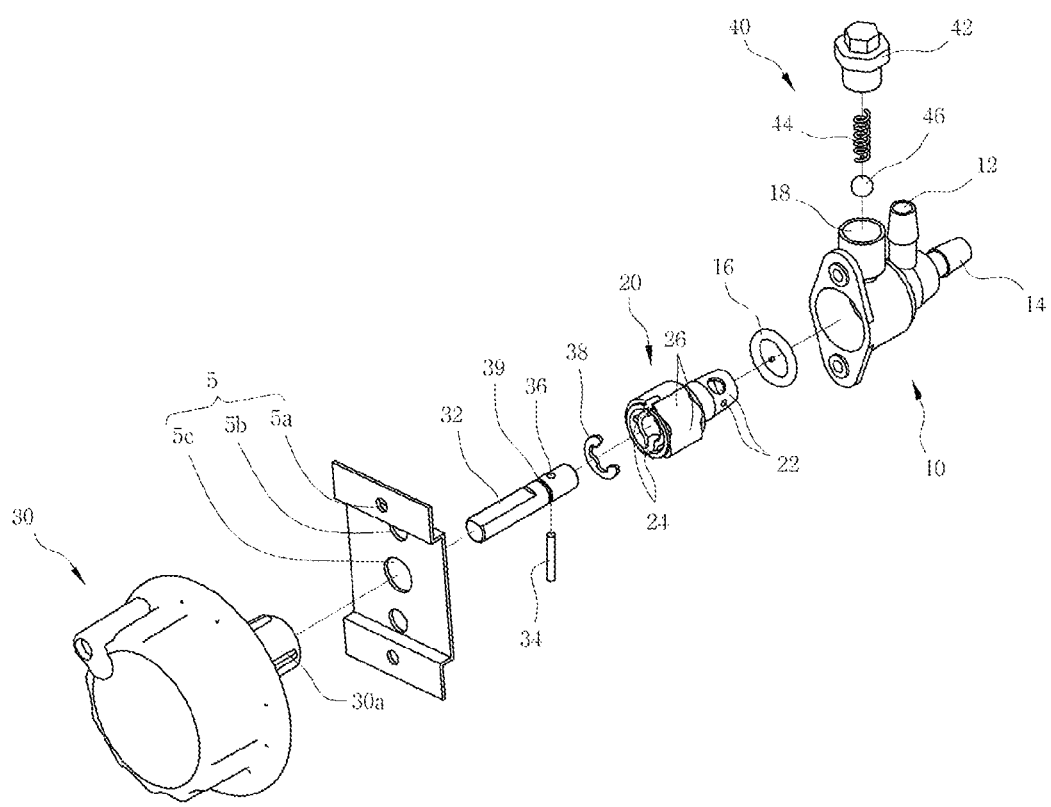
FIG. 3 is an exploded perspective view illustrating the configuration of the heating power adjusting apparatus in accordance with the embodiment of the present invention.
Figure 4:
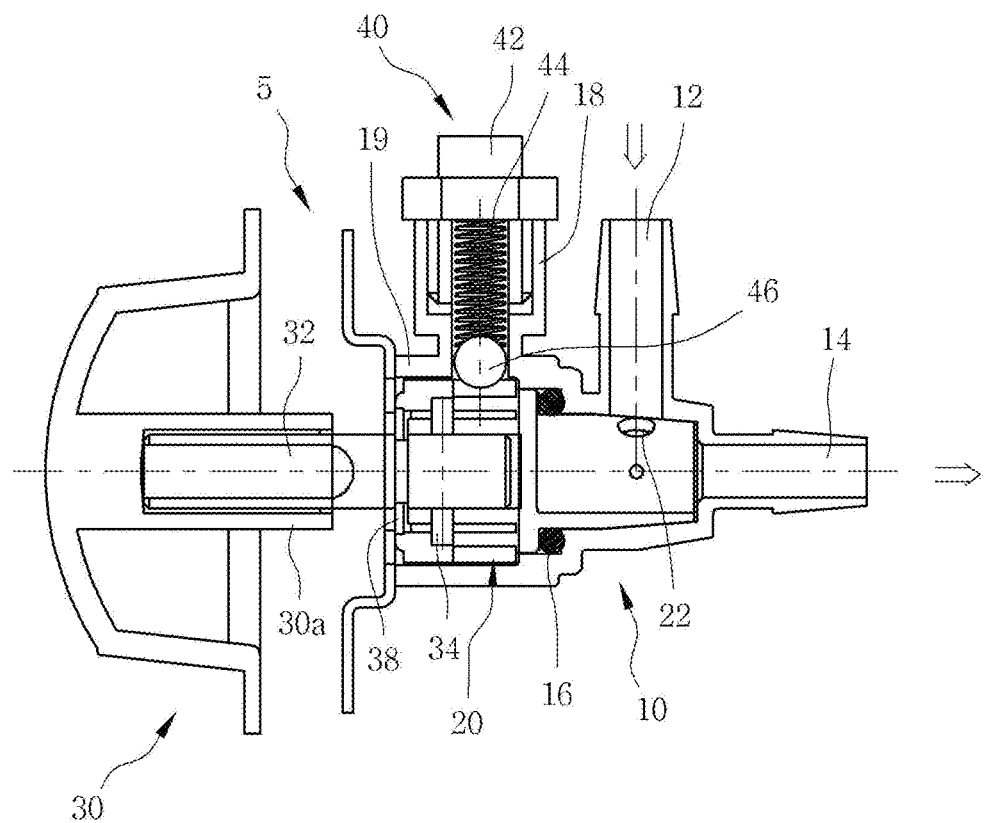
FIG. 4 is a cross-sectional view illustrating the configuration of the heating power adjusting apparatus in accordance with the embodiment of the present invention.
Figure 5:
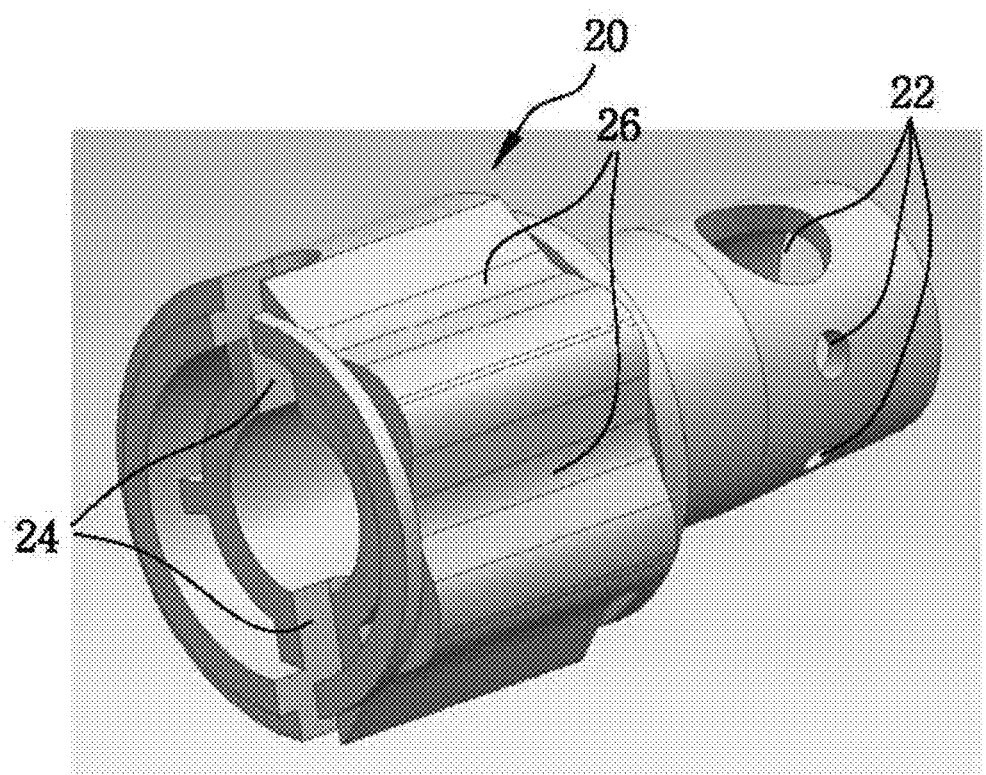
FIG. 5 is an enlarged perspective view illustrating an orifice body shown in FIG. 3.

With reference to FIGS. 1 to 5, a heating power adjusting apparatus of a hot blast heater in accordance with one embodiment of the present invention is installed on a flow path (shown by arrows in FIG. 1) of air between a vane pump 1 and a burner head 3, and is configured such that a flow rate of air supplied to the burner head 3 may be variably adjusted according to user selection.

For this purpose, the heating power adjusting apparatus in accordance with the embodiment of the present invention includes a valve body 10 installed on the air flow path located between an exit 1a of the vane pump 1 and an entrance 3a of the burner head 3, an orifice body 20 inserted into an air flow space formed within the valve body 10, rotatably installed and provided with a plurality of orifices 22 having different air flow cross-sectional areas, and a rotary knob 30 to adjust rotation of the orifice body 20 with respect to the valve body 10. Further, the burner head 3 includes an inlet 3b through which fuel is supplied to the inside of a combustion chamber, formed at the side thereof, in addition to the air entrance 3a.

The valve body 10 includes an air injection part 12 communicating with the exit 1a of the vane pump 1 and an air exhaust part 14 communicating with the entrance 3a of the burner head 3, and the air flow space is formed between the injection part 12 and the exhaust part 14.

The orifice body 20 is rotatably installed in the air flow space of the valve body 10, and is provided with the plural orifices 22 having flow cross-sectional areas of different diameters so as to adjust the flow rate of air in multiple stages. Here, the plural orifices 22 are disposed so as to be radially separated at proper intervals along the overall circumferential surface of the orifice body 20.

The rotary knob 30 executes selective switching between the orifices 22 having the different cross-sectional areas in the air flow space in the valve body 10 by adjusting rotation of the orifice body 20 with respect to the valve body 10, thus serving to variably control the flow rate of air supplied to the burner head 3.

In this case, an O-ring 16 formed of an airtight material is installed at an assembly region between the valve body 10 and the orifice body 20. The O-ring 16 may prevent air from leaking to the outside through undesired routes over the injection part 12 and the exhaust part 14 of the valve body 10 and the air flow space in the orifice body 20.

Further, the rotary knob 30 is connected to the orifice body 20 through a rotary shaft 32. One end of the rotary knob 32 is inserted into a boss part 30a of the rotary knob 30, and the other end of the rotary knob 32 is fixed to the orifice body 20 by a fastening pin 34.

The rotary shaft 32 is provided with a through hole 36 passing through a member of the rotary shaft 32 in the radial direction to install the fastening pin 34, and the orifice body 20 is provided with assembly holes 24, each of which is provided with one surface opened in the insertion direction of the fastening pin 34, by cutting a member of the orifice body 20 in the radial direction to install the fastening pin 34. That is, the rotary shaft 43 may transmit rotary force applied to the rotary knob 30 to the orifice body 20 via the rotary shaft 32 by inserting the fastening pin 34, inserted into the through hole 36, into the assembly holes 24 of the orifice body 20.

Further, in order to prevent separation of the rotary shaft 32 from the orifice body 20, a snap ring 38 is installed. The snap ring 38 is inserted into a stepped groove 39 formed on the outer circumferential surface of the rotary shaft 32 in the circumferential direction in the rear of the through hole 36.

For this purpose, the valve body 10 is provided with a mounting part 19 formed integrally with an assembly end of the valve body 10 assembled with the rotary shaft 32 and extended to the outside, and a mounting bracket 5 to fix the valve body 10 to the inside of the hot blast heater is separately combined with the mounting part 19. In this case, a hole 5a for installation of the valve body 10 in the hot blast heater and a hole 5b for combination with the mounting part 19 of the valve body 10 are formed at each of both ends of the mounting bracket 5. Further, a hole 5c for insertion of the rotary shaft 32 is formed at the center of the mounting bracket 5.

Here, the snap ring 38 is located at a corresponding position between the mounting bracket 5 and the valve body 10, i.e., at a position contacting the rear surface of the hole 5c of the mounting bracket 5 combined with the mounting part 19 of the valve body 10, and is thus supported so as to restrict separation of the snap ring 38 in the axial direction due to contact with the outer circumferential surface of the hole 5c.

Therefore, when the rotary shaft 32 is combined with the orifice body 20 by inserting the fastening pin 34 into the assembly holes 24 of the orifice body 20, the snap ring 38 may prevent separation of the fastening pin 34 in the axial direction from the assembly holes 24 and restrict separation of the rotary shaft 32 from the orifice body 20, simultaneously, by contact with the mounting bracket 5.

Further, the heating power adjusting apparatus in accordance with the embodiment of the present invention includes a stopper device 40 to properly intermit the rotating state of the orifice body 20 with respect to the valve body 10 and to allow a user to feel a locking sense during rotation of the orifice body 20. The stopper device 40 includes a cap-shaped plug 42 fixed to an installation part 18 of the valve body 10 by screw connection, a return spring 44 installed in a compressed state within the installation part 18 by fastening the plug 42 to the installation part 18, and a metal ball 46 contacting a free terminal of the return spring 44 in the installation part 18 so as to be elastically supported by the return spring 44 and restricting rotation of the orifice body 20 with respect to the valve body 10 within an elasticity range of the return spring 44.

In this case, a plurality of bending grooves 26 supporting the metal ball 46 seated on the outer circumferential surfaces thereof to restrict rotation of the orifice body 20 with respect to the valve body 10 is formed on the orifice body 20. Here, the number of the bending grooves 26 is set to be the same as the number of the orifices 22, there achieving selective switching between the cross-sectional areas of the orifices 22 in the air flow space of the valve body 10.

Therefore, the heating power adjusting apparatus in accordance with the embodiment of the present invention includes the valve body 10 provided between the exit 1a of the vane pump 1 and the entrance 3a of the burner head 3 and forming the air flow path to supply external air to the combustion chamber of the burner, the orifice body 20 rotatably installed in the valve body 10 and variably adjusting the flow cross-sectional area of air, and the rotary knob 30 to manipulate the orifice body 22, and thereby, may adjust the flow rate of air through selective switching between the orifices 22 having various diameters formed on the orifice body 22 and adjust heating power of the burner to a desired level via pressure control therethrough.

The above-described heating power adjusting apparatus in accordance with the embodiment of the present invention may adjust heating power of the hot blast heater to a proper level desired by a user via pressure control caused by variable adjustment of the flow cross-sectional area through installation of the orifice structure having a relatively simple shape on a supply path of external air from the exit 1a of the vane pump 1 to the entrance 3a of the burner head 3, thereby not only greatly reducing financial burden required to construct equipment relating to adjustment of heating power, but also greatly reducing costs required to manage, maintain and repair the equipment using the relatively simple mechanical device configuration.

As apparent from the above description, one embodiment of the present invention provides a heating power adjusting apparatus of a hot blast heater which includes an orifice structure achieving selective switching between flow cross-sectional areas of air in an air flow path to supply external air to a combustion chamber of a burner and installed between a pump and a burner head, and achieves a function of adjusting heating power of a burner to a desired level via pressure control according to adjustment of the flow rate of air by the installed orifice structure.

Particularly, the heating power adjusting apparatus in accordance with the embodiment of the present invention may adjust heating power to a proper level desired by a user through pressure control caused by variable adjustment of the flow cross-sectional area through the relatively simple mechanical configuration on the supply path of air, thereby not only greatly reducing financial burden required to construct equipment to adjust heating power, but also greatly reducing costs required to manage, maintain and repair the equipment using the relatively simple mechanical device configuration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A heating power adjusting apparatus of a hot blast heater which adjusts the heating power of the hot blast heater by controlling a flow cross-sectional area of air supplied to a burner of the hot blast heater, comprising:
   a valve body including an air injection part, an air exhaust part, and an air flow space between the air injection part and the air exhaust part;
   an orifice body rotatably installed in the air flow space of the valve body and provided with a substantially cylindrical segment having a plurality of orifices, the plurality of orifices having different flow cross-sectional areas to variably adjust the flow rate of air, the plurality of orifices being formed on a circumferential surface of the substantially cylindrical segment of the orifice body;
   a rotary knob to adjust rotation of the orifice body with respect to the valve body; and
   a rotary shaft connecting the orifice body and the rotary knob.

2. The heating power adjusting apparatus according to claim 1, wherein the rotary shaft is fixed to the orifice body by a fastening pin, the rotary shaft is provided with a through hole to install the fastening pin, and the orifice body is provided with assembly holes to install the fastening pin.

3. The heating power adjusting apparatus according to claim 2, wherein a snap ring is fastened to the outer circumferential surface of the rotary shaft, the snap ring is supported by a mounting bracket combined with the valve body and restricts separation of the rotary shaft from the orifice body, and a stepped groove to install the snap ring is formed on the outer circumferential surface of the rotary shaft.

4. The heating power adjusting apparatus according to claim 1, further comprising an O-ring installed at an assembly region between the valve body and the orifice body and maintaining airtightness of the air flow space.

5. The heating power adjusting apparatus according to claim 1, further comprising a stopper device installed on the valve body and intermitting the rotating state of the orifice body.

6. The heating power adjusting apparatus according to claim 1, further comprising:
   an installation part formed on an outer circumferential surface of the valve body;
   a plug fixed to the installation part of the valve body by screw connection;
   a return spring installed in a compressed state within the installation part by the plug; and
   a metal ball elastically supported by the return spring and restricting rotation of the orifice body within an elasticity range of the return spring.

7. The heating power adjusting apparatus according to claim 5, wherein a plurality of bending grooves supporting the metal ball seated thereon is formed on the outer circumference of the orifice body.

* * * * *